United States Patent [19]
Yamamoto

[11] Patent Number: 5,579,448
[45] Date of Patent: Nov. 26, 1996

[54] PRINTING APPARATUS FOR PRINTING OF QUARTER EM-SIZE

[75] Inventor: Ichiro Yamamoto, Nagoya, Japan

[73] Assignee: Brother Kogyo Kabushiki Kaisha, Nagoya, Japan

[21] Appl. No.: 191,078

[22] Filed: Feb. 4, 1994

[30] Foreign Application Priority Data

Apr. 14, 1993 [JP] Japan .................................. 5-112121

[51] Int. Cl.⁶ .................................................. G06K 15/00
[52] U.S. Cl. ................................... 395/110; 395/117
[58] Field of Search ................................ 395/110, 119, 395/117, 115, 112, 109, 101

[56] References Cited

U.S. PATENT DOCUMENTS

| | | | |
|---|---|---|---|
| 5,288,155 | 2/1994 | Suzuki | 400/83 |
| 5,299,294 | 3/1994 | McCracken et al. | 395/110 |
| 5,353,387 | 10/1994 | Petschik et al. | 395/109 |
| 5,367,618 | 11/1994 | Ishida | 395/145 |
| 5,398,306 | 3/1995 | Karow | 395/110 |
| 5,410,640 | 4/1995 | Morikawa et al. | 395/110 |
| 5,459,828 | 10/1995 | Zack et al. | 395/151 |

*Primary Examiner*—Raymond J. Bayerl
*Assistant Examiner*—Steven P. Sax
*Attorney, Agent, or Firm*—Oliff & Berridge

[57] ABSTRACT

According to a printing apparatus of the invention, for a printing operation of print data of special size which is transmitted from a host computer, when any quarter em-size letter is contained in the print data, it is judged whether font data of half resolution exists. If the font data of half resolution exists, the font data of half resolution is read out, and a quarter em-size letter is printed on the basis of the read-out font data. On the other hand, if no font data of half resolution exists, font data for the quarter em-size letter is prepared on the basis of the font data of special resolution and printed. Therefore, quarter em-size letters can be printed with high quality.

15 Claims, 5 Drawing Sheets

600DPI

300DPI

600DPI

300DPI

PRINTING APPARATUS FOR PRINTING OF QUARTER EM-SIZE

BACKGROUND OF THE INVENTION

1. Field of the Invention

This invention relates to a printing apparatus for printing quarter em-size letters with a high print quality.

2. Description of Related Art

Most of printing apparatuses which are presently used have a resolution of 300 DPI. However, it is expected, from the viewpoint of the improvement of print quality, that printing apparatuses having higher resolution, for example 600 DPI, will become dominant in the near future. Most of these printing apparatuses, such as laser printers for carrying out a printing operation with 600 DPI resolution, are so designed that the resolution is switchable between 600 DPI and 300 DPI to permit printing of print data which is set in 300 DPI resolution. Some of these laser printers, which are capable of printing print data of both 600 DPI and 300 DPI resolution, are equipped with font data for 600 DPI and font data for 300 DPI. Other laser printers are equipped with only the font data for 600 DPI to reduce required memory capacity for font data.

For a printing operation of a special-size letter other than the em-size (standard size) letters, such as a lateral double em-size letter, which is obtained by doubly enlarging the lateral, or horizontal, size of an em-size letter while keeping its vertical size; a vertical double em-size letter which is obtained by doubly enlarging the vertical size of an em-size letter while keeping its lateral or horizontal size; a quadruple em-size letter which is obtained by doubly enlarging both of the lateral or horizontal size and the vertical size of an em-size letter; or a quarter em-size letter which is obtained by reducing each of the lateral or horizontal size and the vertical size of an em-size letter to half size, font data which are exclusively used for these special size letters are not equipped with the laser printers for the purpose of suppressing memory capacity for the whole font data. Accordingly, in order to obtain these special size letters in a laser printer, the font data for letters of each size are prepared using font data for em-size letters which are stored in the laser printer and a printing operation of desired-size letters is carried out on the basis of the prepared font data.

For the preparation of the font data for special-size letters from the font data for em-size letters, the font data for letters whose size is larger than the em-size can be relatively easily prepared by enlarging the dot interval of dot arrays constituting the em-size letters in a desired enlarging direction, for example, by doubly enlarging the vertical dot interval when vertical double em-size letters are required to be obtained.

However, for the preparation of the font data for quarter em-size letters, whose size is smaller than the em-size, a complicated processing is required in addition to the above size altering processing. That is, half of vertically- or horizontally-arranged, that is, laterally-arranged dots, (hereinafter referred to as "vertical and lateral dots") which constitute the font data for em-size letters are first thinned out, and then a size-altering processing in which each of the vertical and lateral sizes is reduced to its half size is carried out to thereby prepare the font data for quarter em-size letters. Through this thinning processing, for example, there occurs a problem that two separated portions of "Kanji" are contacted with each other, or the apex of a triangle at an upper portion of a capital letter "A" is blurred. In order to solve this problem, a repairing processing for repairing a letter-unclarified (damaged) portion is executed in accordance with a well-known algorithm. This repairing processing requires a long time. In addition, even if the letter repairing processing using the well-known algorithm is conducted, a beautiful face (letter style) cannot be obtained by the font data for quarter em-size letters which are obtained by reducing the em-size letters, and thus there occurs a problem that the letters appear to be battered.

SUMMARY OF THE INVENTION

An object of this invention is to provide a printing apparatus capable of printing quarter em-size letters with high print quality.

The printing apparatus of this invention includes a first font data storing means for storing font data of a first resolution, judging means for judging the presence or absence of second font data storing means for storing font data of a second resolution which is half of the first resolution when print data represents a quarter em-size letter, and control means for performing such a control that when the judging means judges the presence of the second font data storing means, the quarter em-size letter is printed on the basis of the font data stored in the second font data storing means, and when the judging means judges the absence of the second font data storing means, the quarter em-size letter is printed on the basis of the font data stored in the first font data storing means.

The printing apparatus of the invention thus structured includes the first font data storing means for storing the font data of a first resolution. When print data is transmitted from a host computer and printed, the presence or absence of the second font data storing means for storing the font data of a second resolution which is half of the first resolution is judged when the print data represents the quarter em-size letter. If the presence of the second font data storing means is judged, the quarter em-size letter is printed on the basis of the font data of second resolution. On the other hand, if the absence of the second font data storing means is judged, the quarter em-size letter is printed on the basis of the font data of the first font data storing means.

As described above, if the second font data storing means for holding the font data of half resolution is provided, the quarter em-size letters are printed using the font data of the half resolution. Accordingly, the font data for the quarter em-size letters are not required to be prepared and the battering of the letters which has conventionally occurred during the preparation of the font data for the quarter em-size letters can be prevented which results in an improvement in print quality.

As is apparent from the foregoing, according to the print apparatus of the invention, in the case where a printing operation is conducted on print data whose resolution is set to a special resolution and quarter em-size letters are contained in the print data, the printing operation is carried out using the font data of half of the special resolution, and thus a processing for preparing the font data for the quarter em-size letters is not required. Therefore, the printing processing can be carried out at high speed and with a high print quality.

BRIEF DESCRIPTION OF THE DRAWINGS

A preferred embodiment of the invention will be described in detail with reference to the following figures in which.

DETAILED DESCRIPTION OF THE PREFERRED EMBODIMENTS

A laser printer which is implemented as an embodiment of the invention will be described with reference to the accompanying drawings.

Figure 1:
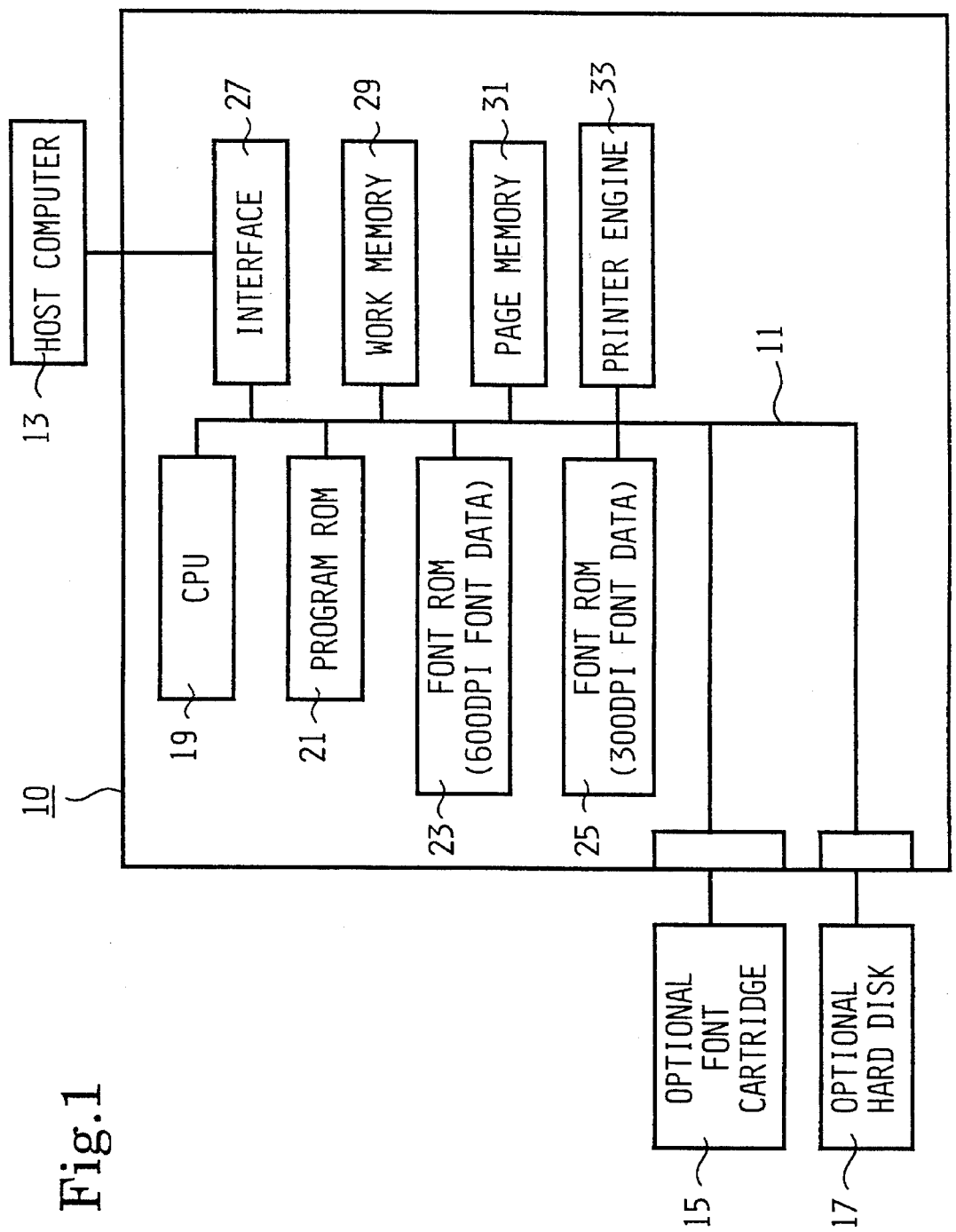
FIG. 1 is a block diagram showing a laser printer according to an embodiment of the invention.

FIG. 1 is a block diagram showing the structure of a laser printer 10 of the embodiment. The laser printer 10 is connected to a host computer 13. The laser printer 10 is so designed as to perform a printing operation on the basis of print data transmitted from the host computer 13. An optional font cartridge 15 and an optional hard disk 17 for extension of memory are detachably installed in the laser printer 10.

The optional font cartridge 15 has font data having lower resolution (300 DPI) than the resolution (600 DPI) of font data which is originally equipped with the laser printer 10 or font data whose face (letter style) is different from that of the original font data of the laser printer 10, so that font data in the cartridge 15 can be used with the laser printer 10.

On the other hand, the optional hard disk 17 is installed into the laser printer 10 when an user uses a plurality of different faces (letter styles) and is so designed to hold the plurality of faces of font data which are transmitted from the host computer 13.

As described above, the laser printer 10 of this embodiment receives the print data from the host computer 13 through an interface 27. The interface 27 is connected through a bus line 11 to a CPU 19 for controlling the laser printer 10. The CPU 19 is connected through the bus line 11 to a program ROM 21 for holding a control program for the CPU 19, a font ROM 23 for holding the built-in font data for high resolution (600 DPI) printing, a font ROM 25 for holding the font data for half resolution (300 DPI) of the high resolution, a work memory 29 serving as a working area of the CPU 19 for preparing font data for special size letters from the font data for em-size letters, a page memory 31 for storing bit map data to which received print data are developed, and a printer engine 33 for carrying out both of printing operations in high-resolution (600 DPI) and low-resolution (300 DPI) modes.

Figure 2:
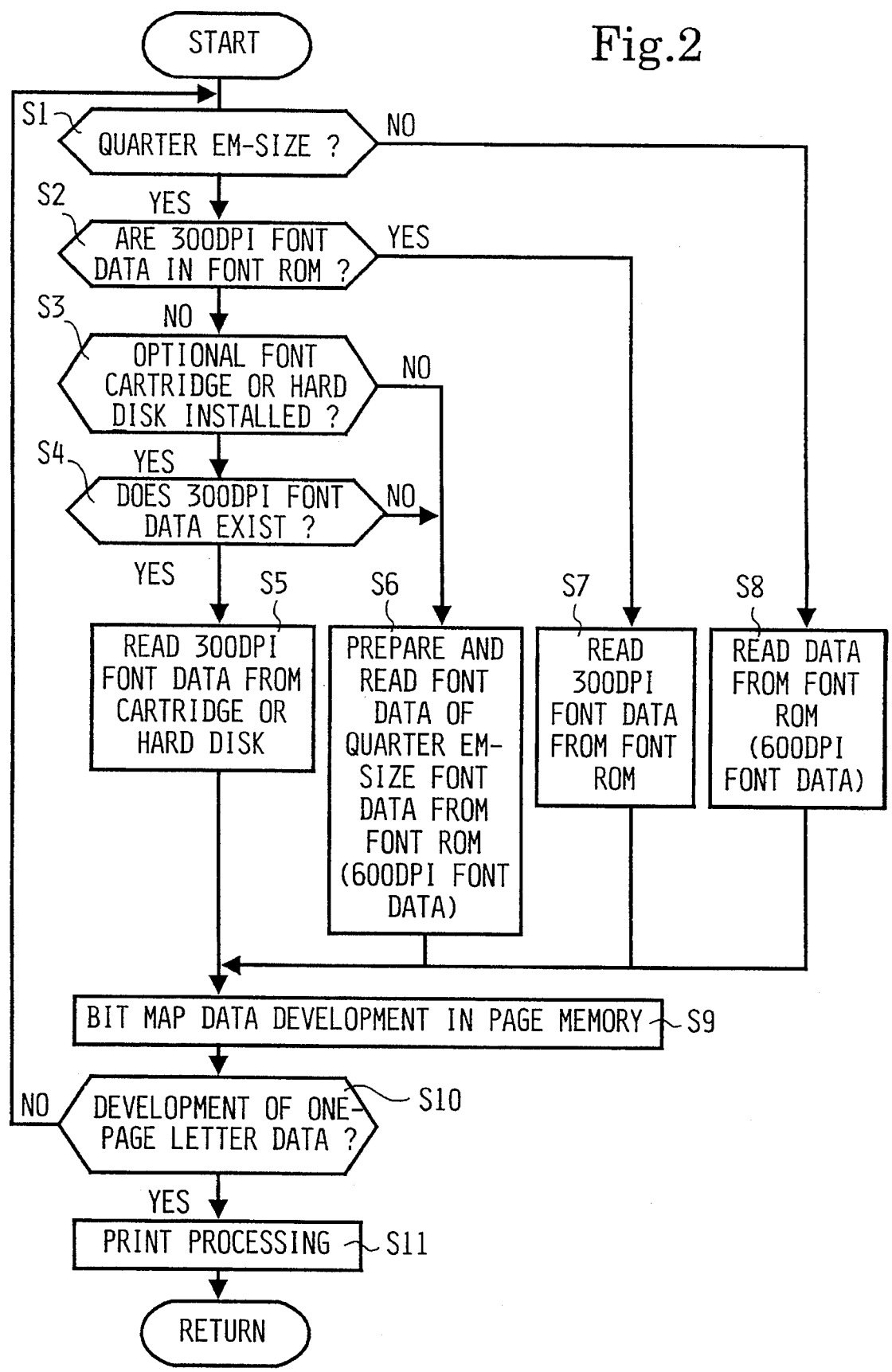
FIG. 2 is a flowchart showing the processing of the laser printer as shown in FIG. 1.

Next, the operation of the laser printer of the embodiment shown in FIG. 1 will be described with reference to the flowchart of FIG. 2.

At the time when the print data is transmitted from the host computer 13, the CPU 19 starts the print processing routine. In the following description, it is assumed that 600 DPI resolution is set in the transmitted print data. For execution of the processing on respective print letters (print letter data) in the print data, the CPU 19 first judges whether the size of a print letter is quarter em-size (judgment step S1). If the size of the print letter is not the quarter em-size (judgment 1 has a negative judgment "No"), the program goes to step S8 to read from the built-in font ROM 23 the font data of 600 DPI which corresponds to the print letter. Then the program goes to step S9 to develop the font data (print data) corresponding to the print letter to bit map data in the page memory 31.

At the judgment step S10, it is judged whether the development of one-page of print letters is terminated. If the development of one-page of print letters is judged not to be terminated (judgment step S10 has a negative judgment "No"), the program returns to the step S1 to start the processing of the next print letter data.

Next, the processing of quarter em-size letters in the print data will be described.

If a quarter em-size is indicated for any print letter in the print data, the above judgment step S1 would have a positive judgment, i e., "Yes" and the program goes to a judgment step S2. At the judgment step S2, it is judged whether any 300 DPI font data exists in the built-in ROM. In this embodiment, since the laser printer 10, shown in FIG. 1, is assumed to be equipped with the font ROM 25 holding the 300 DPI font data, the judgment step S2 is a positive judgment "Yes", and the program goes to step S7. At the step S7, the font data for 300 DPI which corresponds to the print letter concerned is read out from the font ROM 25. At step 9, the font data corresponding to the print letter concerned is developed to the bit map data in the page memory 31.

Figure 3:
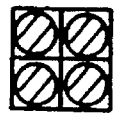
FIGS. 3A and 3B are schematic diagrams showing the size of one dot for 600 DPI and 300 DPI resolution cases, respectively.
Figure 3:
Figure 4A:
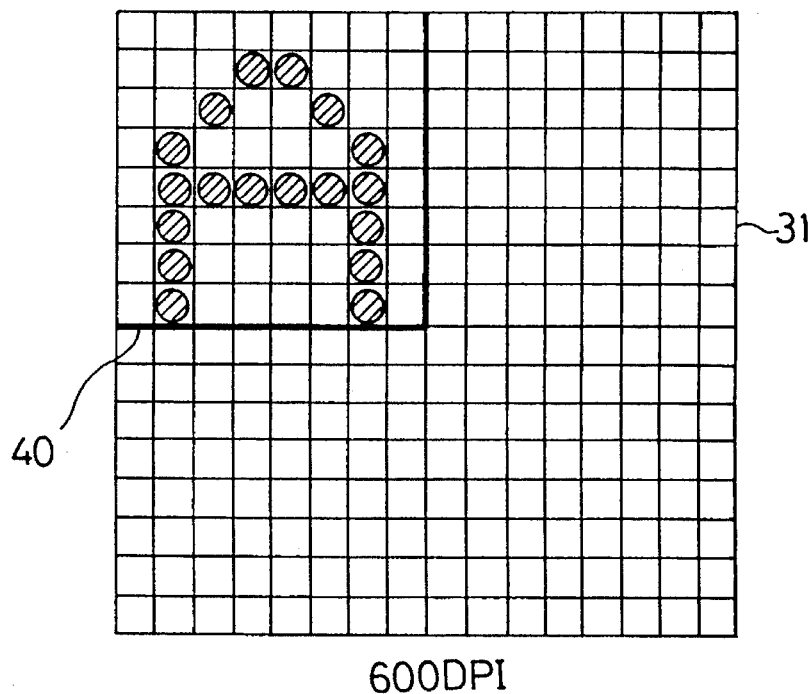
FIGS. 4A and 4B are diagrams showing the state where font data for 300 DPI are developed with 600 DPI dots in this embodiment.
Figure 4B:
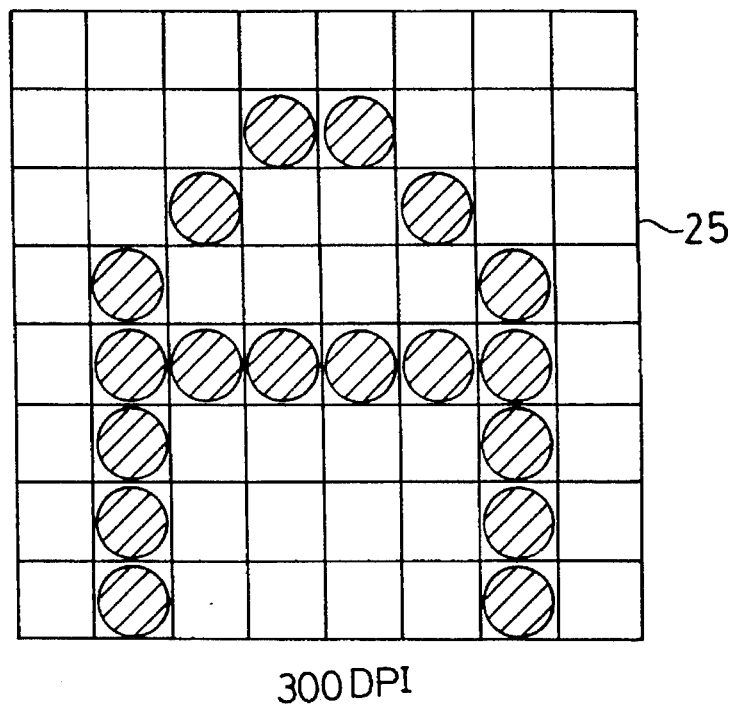

For example, in a case where the font data of 600 DPI comprises 16 dots in vertical direction and 16 dots in lateral, or horizontal, direction, the font data of 300 DPI comprises 8 dots in each of the vertical and lateral directions. Therefore, if the font data of 300 DPI are directly developed, then a bit map data for quarter em-size letter would be obtained. That is, as shown in FIGS. 3A and 3B, the size of one dot of the 600 DPI font data corresponds to one-quarter of the size of one-dot of the 300 DPI font data. Accordingly, when, as shown in FIGS. 4A and 4B, the font data for "A" stored in the font ROM 25 for 300 DPI resolution is developed to the bit map area 40 comprising 8 dots in the vertical direction and 8 dots in the lateral direction in the page memory 31, it will directly become the font data "A" of quarter em-size. At the next judgment step S10, it is judged whether the development of one-page of letter data is terminated. If the development of the one-page of letter data is judged not to be terminated (judgment step S10 has a negative judgment "No"), the program returns to the step S1 to carry out the processing of a next print letter data.

The processing from the steps S1 to S10 is repeated for each print letter data in the print data, and if the data are developed for one page, the judgment step would have a positive judgment "Yes". In response to the "Yes" in step S10, the CPU 19 advances the processing to a step S11 so that the bit map data of one page which is developed in the page memory are transmitted to the printer engine 33 and printed. Thereafter, the processing for the next page is started (RETURN).

Figure 5:
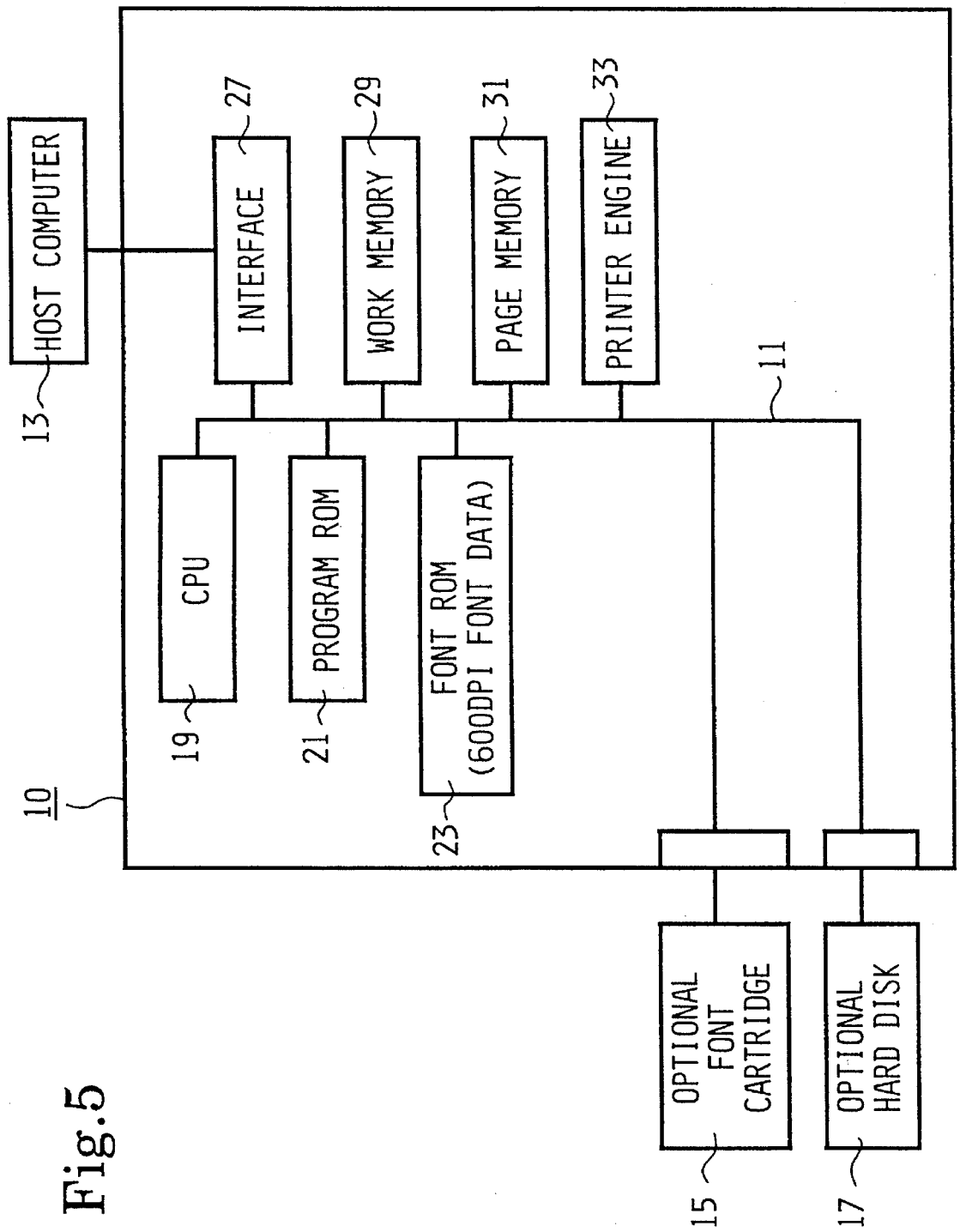
FIG. 5 is a block diagram showing the state where one of font ROMs is removed from the laser printer as shown in FIG. 1.

The processing for a case where no font ROM for storing font data for 300 DPI is provided to the laser printer 10 as shown in FIG. 5 will also be described with reference to the flowchart of FIG. 2.

Upon transmission of the print data from the host computer 13, the CPU 19 judges whether the size of a print letter (print letter data) in the print data is the quarter em-size (judgment step S1). If the size of the print letter is judged not to be the quarter em-size, the processing at the step 8 is carried out in the same manner as described in association with FIG. 1. The program goes to the step S9 to develop the font data corresponding to the print letter concerned to the bit map data in the page memory 31. At the next Judgment step S10, it is judged whether the development of one-page of print letters is completed. If the development of the one-page of letters is not completed, the program returns to the step S1 to start the processing for a next print letter data (throughout this specification letter and letter data stand for alphanumeric and symbolic information that is to be printed).

The processing of the print letter (print letter data) of quarter em-size which is contained in the print data will be described.

When the quarter em-size is indicated for the print letter in the print data, the above judgment step S1 has a positive judgment "Yes" and the program goes to the step S2. At the judgement step S2, it is judged whether the 300 DPI font data are provided to the built-in font ROM. As described above, the laser printer 10, as shown in FIG. 5, is provided with only the font ROM 23 for storing the 600 DPI font data and there is no font ROM for storing the 300 DPI font data. Therefore, the judgment step S2 is a negative judgment "No" and the program goes to judgment step S3. At the judgment step S3, it is judged whether an optional font cartridge or optional hard disk is installed. Since the laser printer 10, as shown in FIG. 5, is provided with the optional font cartridge 15 and the optional hard disk 17, the judgment step 3 has a positive judgment "Yes" and the program goes to the next step S4. At the judgment step S4, it is judged whether the 300 DPI font data is stored in the optional font cartridge 15 or the optional hard disk 17.

The following description relates to a case where the judgment step S4 has a positive judgment "Yes" because the 300 DPI font data is stored in the optional font cartridge 15.

When the judgment step S4 has a positive judgment "Yes", the program goes to the step S5 to read out the 300 DPI font data corresponding to the print letter concerned from the optional font cartridge 15. At the next step S9, like the processing of the laser printer 10 shown in FIG. 1, the font data corresponding to the print letter concerned is developed to the bit map data in the page memory 31.

On the other hand, when no 300 DPI font data is stored in either of the optional font cartridge 15 and the optional hard disk 17, the judgment step S4 has a negative judgment "No" and the program goes to the processing of step S6. This is also carried out for the case where the judgment step S3 has a negative judgment "No" because neither an optional font cartridge nor an optional hard disk are installed. At step S6, the font data for the em-size letter of 600 DPI which corresponds to the print letter concerned is read out from the built-in ROM 23 to prepare the font data for quarter em-size letter on the work memory 29.

In this processing, respective halves of the vertical and lateral dots which constitute the font data for an em-size letter are first thinned out and a reducing processing for reducing each of the vertical size and the lateral size to its half size is carried out. Subsequently, in order to repair the shape (outline) of the letter which is destroyed by the above thinning processing, repair processing is conducted in accordance with a well-known algorithm to prepare the font data for quarter em-size letter. The program then goes to step S9 to develop the font data corresponding to the print letter concerned to the bit map data in the page memory 31. At a next judgment step S10, it is judged whether the development of one-page of letters is completed. If the development of the one-page of letters is judged not to be completed (judgement step S10 has a negative judgment "No"), the program returns to the step S1 to carry out the processing for the next letter data.

The processing as described above is repeated for all the print letter data and, when the processing for one-page printing of the letters is carried out, the CPU 19 carries out the printing operation in the same manner as the laser printer 10 as shown in FIG. 1 (step S11).

As described with reference to FIG. 1, when the laser printer 10 is provided with the 600 DPI font data and the 300 DPI font data, the 300 DPI font data is directly used as the font data for quarter em-size letter for the processing of the em-size print letter data in the print data to which 600 DPI resolution is set. Therefore, this embodiment can omit both the thinning processing for the vertical and lateral dots for the em-size letter and the repairing processing for the shape of the letter which is destroyed by the thinning processing, which has been required in the conventional laser printer to prepare the font data for the quarter em-size letter from the font data for the em-size letter for 600 DPI resolution. Thus, the printing operation can be carried out at high speed.

In the prior art, the quarter em-size letter has been destroyed even after the repairing processing of the letter and, therefore, high-quality printing cannot be performed. However, according to this embodiment, the quarter em-size letter is printed using the 300 DPI font data directly so that the high-quality printing can be performed.

When no 300 DPI font data is provided to the laser printer 10, as shown in FIG. 5, it is checked whether the 300 DPI font data is stored in the optional font cartridge 15 or the optional hard disk 17. In this case, if the 300 DPI font data is stored in either of the optional cartridge 15 and the optional hard disk 17, the quarter em-size letter can be automatically printed using the 300 DPI font data.

In the above embodiment, the laser printer is used as the printing apparatus. However, this invention can be suitably applied to various printing apparatuses capable of performing a printing operation in plural resolution modes, such as an LED printer and an ink jet printer.

Further, in the above embodiment, the description has been in the context of a laser printer in which 600 DPI resolution and 300 DPI resolution are switchable to each other. However, this invention is also applicable to a laser printer having a high resolution of 1200 DPI and a low resolution of 600 DPI.

What is claimed is:

1. A printing apparatus for printing letters corresponding to input print data, including:

first font data storing means for storing font data of a first resolution;

judging means for judging a presence of a second font data storing means for storing font data of a second resolution which is half of the first resolution when the print data is a quarter em-size letter; and control means for performing such a control that when said judging means judges the presence of said second font data storing means, the quarter em-size letter is printed on the basis of the font data stored in said second font data storing means, and when said judging means judges the absence of said second font data storing means, the quarter em-size letter is printed on the basis of the font data stored in said first font data storing means.

2. The printing apparatus as claimed in claim 1, wherein said second font data storing means is an internal font ROM.

3. The printing apparatus as claimed in claim 1, wherein said second font data storing means is at least one of an optional font cartridge and an optional hard disk.

4. A method of printing letters, corresponding to print data inputted to a printing apparatus where the letters may be either full em-size letters or quarter em-size letters, comprising the steps of:

determining if an inputted letter is a quarter em-size letter and when such occurs;

ascertaining whether font data of one-half a standard resolution are stored in a second font storing means, font data of standard resolution being stored in a first font storing means, and when said second font storing means exists;

reading font data from said second font storing means;

developing bit map data; and printing the bit map data.

5. The method as claimed in claim 4, wherein said ascertaining step further comprises the step of judging whether said second font storing means exists as an internal font ROM.

6. The method as claimed in claim 5, wherein when said judging step results in a negative judgment, further judging whether at least one of an optional font cartridge and an optional hard disk storing said font data of one-half the standard resolution is connected to the printing apparatus.

7. The method as claimed in claim 4, wherein when said ascertaining step results in a negative judgment, font data is read from the first font storing means.

8. The method as claimed in claim 7, further comprising the step of subjecting said font data from the first font storing means to dot density reduction in vertical and horizontal directions.

9. The method as claimed in claim 8, further comprising the steps of:

reducing in size the font data that has been subjected to dot density reduction; and repair processing the reduced in size font data prior to the developing and printing steps.

10. A printing apparatus for using input letters that may be either full em-size letters or quarter em-size letters, comprising:

means for determining if an inputted letter is a quarter em-size letter and when such occurs;

means for ascertaining whether font data of one-half a standard resolution are stored in a second font storing means, font data of standard resolution being stored in a first font storing means, and when said second font storing means exists;

means for reading font data from said second font storing means;

means for developing bit map data; and means for printing the bit map data.

11. The printing apparatus as claimed in claim 10, wherein said means for ascertaining further comprises means for judging whether said second font storing means exists as an internal font ROM.

12. The printing apparatus as claimed in claim 11, wherein when said means for judging produces a negative judgment, said means for judging further judges whether at least one of an optional font cartridge and an optional hard disk storing said font data of one-half the standard resolution is connected to the printing apparatus.

13. The printing apparatus as claimed in claim 10, wherein when said means for ascertaining produces a negative judgment, said means for reading reads font data from the first font storing means.

14. The printing apparatus as claimed in claim 13, further comprising means for subjecting said font data from the first font storing means to dot density reduction in vertical and horizontal directions.

15. The printing apparatus as claimed in claim 14, further comprising:

means for reducing in size the font data that has been subjected to dot density reduction; and means for repair processing the reduced in size font data prior to operation of the means for developing and the means for printing.

* * * * *